United States Patent
Rahul et al.

(10) Patent No.: US 12,045,469 B2
(45) Date of Patent: Jul. 23, 2024

(54) SINGLE EVENT UPSET TOLERANT MEMORY DEVICE

(71) Applicant: XILINX, INC., San Jose, CA (US)

(72) Inventors: Kumar Rahul, Hyderabad (IN); John J. Wuu, Fort Collins, CO (US); Santosh Yachareni, Hyderabad (IN); Nui Chong, San Jose, CA (US); Cheang Whang Chang, Mountain View, CA (US)

(73) Assignee: XILINX, INC., San Jose, CA (US)

(*) Notice: Subject to any disclaimer, the term of this patent is extended or adjusted under 35 U.S.C. 154(b) by 34 days.

(21) Appl. No.: 18/082,223

(22) Filed: Dec. 15, 2022

(65) Prior Publication Data

US 2024/0201863 A1    Jun. 20, 2024

(51) Int. Cl.
  *G06F 12/00*    (2006.01)
  *G06F 3/06*    (2006.01)

(52) U.S. Cl.
  CPC .......... *G06F 3/0619* (2013.01); *G06F 3/0629* (2013.01); *G06F 3/0673* (2013.01)

(58) Field of Classification Search
  CPC .... G06F 3/0619; G06F 3/0629; G06F 3/0673; G06F 3/04146
  See application file for complete search history.

(56) References Cited

U.S. PATENT DOCUMENTS 9,922,700 B2    3/2018  Sinangil et al.
2012/0307545 A1*  12/2012  McAdams ............ G11C 11/221
                                                  365/145

OTHER PUBLICATIONS

Saxena, Gaurav, et al., "Single Event Upset (SEU) in SRAM," International Journal of Engineering Research and Applicaitons, vol. 3, Issue 4, Jul.-Aug. 2013, pp. 2171-2175.
Draper, Don "TSMC's 5nm 0.021um2 SRAM Cell Using EUV and High Mobility Chaneel with Write Assist at ISSCC2020," SemiWiki, Mar. 6, 2020, https://semiwiki.com/semiconductor-manufacturers/tsmc/283487-tsmcs-5nm-0-021um2-sram-cell-using-euv-and-high-mobility-channel-with-write-assist-at-isscc2020/.

* cited by examiner

*Primary Examiner* — Shawn X Gu
(74) *Attorney, Agent, or Firm* — Patterson + Sheridan, LLP

(57) ABSTRACT

A memory device is disclosed herein that leverages high ratio column MUXES to improve SEU resistance. The memory device may be utilized in an integrated circuit die and chip packages having the same. In one example, as semiconductor memory device is provided that includes first and second arrays of semiconductor memory cells, a plurality of sense amplifiers configured to read data states from the first and second arrays of memory cells, and a first plurality of high ratio MUXES connecting the first and second arrays of memory cells to the plurality of sense amplifiers.

20 Claims, 6 Drawing Sheets

SINGLE EVENT UPSET TOLERANT MEMORY DEVICE

TECHNICAL FIELD

Embodiments of the present invention generally relate to a memory device having a high ratio multiplexer, and in particular, to a memory array having bit lines coupled to sense amplifiers through high ratio multiplexers (i.e., multiplexers having an 8 to one or higher input to output ratio).

BACKGROUND

Semiconductor memory is an electronic data storage device, often used as computer memory and implemented on a semiconductor-based integrated circuit, e.g., an integrated circuit (IC) die. Semiconductor memory has much faster access times than other types of data storage technologies. For example, a byte of data can often be written to or read from semiconductor memory within a few nanoseconds, and be located very close to processor circuitry. For this reason, among others, semiconductor memory is increasingly becoming the storage mechanism of choice for computer memory.

In advanced network on chip (NoC) architectures, many memory devices are integrated into a single chip to locally support logic processors. The memory devices generally include a plurality of memory cells arranged in a series of rows and columns. Wordlines extend along respective rows with respective wordlines being coupled to each memory cell along respective rows. Pairs of complementary bit lines extend along respective columns with respective pairs of complementary bit lines being coupled to each memory cell along respective columns. The wordlines allow access to the memory cells on a row-by-row basis, and the complementary bit lines allow data states to be written to or read from accessed memory cells on a column-by-column basis. To conserve chip area, the complementary bit lines often run parallel to one another and are separated from one another by only a small space. As technology improves and feature sizes become smaller, adjacent bit lines (bit cells) are becoming more and more closely spaced. Unfortunately, this close spacing of the bit cells increases the vulnerability of memory device to single event upset (SEU), such as caused by energized particle strikes. SEU can change the state of the memory cell (bit cells). Although conventional software techniques allow the state of the memory cell to be restored after an SEU, the close spacing in advanced node memory architectures significantly increases the number of memory cells that can get corrupted in a single particle strike due to the close proximity of the bit cells (bit lines), making reliance on conventional software corrections less reliable or practical.

Thus, there is a need for an improved memory device.

SUMMARY

A memory device is disclosed herein that leverages high ratio multiplexers (MUXES) to improve SEU resistance. High ratio MUXES having an 8 to one or higher input to output ratio. The memory device may be utilized in an integrated circuit die and chip packages having the same. In one example, as semiconductor memory device is provided that includes first and second arrays of semiconductor memory cells, a plurality of sense amplifiers configured to read data states from the first and second arrays of memory cells, and a first plurality of 8:1 or greater MUXES connecting the first and second arrays of memory cells to the plurality of sense amplifiers.

In another example, each memory cell includes a pair of access transistors that are coupled to a data storage cell of the memory cell.

In another example, the first array of semiconductor memory cells and the second array of semiconductor memory cells each include approximately 4500 memory cells.

In another example, the semiconductor memory cells aligned in a first column spanning the first array and the second array are formed on one of a P or N-doped region of a substrate in the first array, and the other of a P or N-doped region of the substrate in the second array.

In another example, the sense amplifiers are configured to selectively output a WORD having 9 bits when operating one of the first or second arrays, and to output a WORD having 18 bits by operating both of the first or second arrays.

In yet another example, a semiconductor memory device is provided that includes first and second arrays of semiconductor memory cells, a plurality of sense amplifiers configured to read data states from the first and second arrays of memory cells, and a first plurality of high ratio MUXES connecting the first and second arrays of memory cells to the plurality of sense amplifiers. The semiconductor memory device also includes bit lines coupled to the first array of semiconductor memory cells extend over the second array of semiconductor memory cells.

In still another example, a semiconductor memory device is provided that includes first and second arrays of semiconductor memory cells, a plurality of sense amplifiers configured to read data states from the first and second arrays of memory cells, and a first plurality of high ratio MUXES connecting the first and second arrays of memory cells to the plurality of sense amplifiers. Bit lines coupled to the first array of semiconductor memory cells extend over the second array of semiconductor memory cells. The plurality of sense amplifiers are configured to output a word based on the read data states of the first and second arrays of semiconductor memory cells. The first and second arrays of semiconductor memory cells are disposed on a common side of the plurality of sense amplifiers. The sense amplifiers are configured to selectively output a WORD having 9 bits when operating one of the first or second arrays, and to output a WORD having 18 bits by operating both of the first or second arrays. Some of the semiconductor memory cells are aligned in a first column spanning the first array and the second array are formed on one of a P or N-doped region of a substrate in the first array, and the other of a P or N-doped region of the substrate in the second array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements of one embodiment may be beneficially incorporated in other embodiments.

DETAILED DESCRIPTION

Conventional memory devices that utilize 4:1 multiplexers (MUXES) have increased vulnerability to single event upset (SEU) at advanced technology nodes. For example, at 5 nanometer and smaller nodes, the close spacing between bit cells (bit lines) significantly increases the number of memory cells in adjacent columns that can be corrupted by a single particle strike due to the close proximity of the bit cells (bit lines) routed to adjacent 4:1 column MUXES. As further described below, this problem is mitigated through the use of high ratio column MUXES, i.e., column MUXES in static random-access memory (SRAM) having an 8 to one or higher input to output ratio. Compared to conventional memory devices having 4:1 column MUXES, high ratio column MUXES at least doubles the distance between bit cells connected to adjacent MUXES, making the output of the MUXES to sense amplifiers less likely to be corrupted by the same high energy particle strike. Although increasing number column MUX is generally undesirable in terms of increased power consumption, lower performance, and increased size (such as an increase aspect ratio that is especially undesirable for columnar architecture commonly found in field programmable gate array (FPGA) architecture), the techniques and memory cell architecture described below reduces the impact to size increases, thus significantly improving the SEU tolerance of the memory device without appreciable size impact. Other advantages are also disclosed in the text below.

Figure 1:
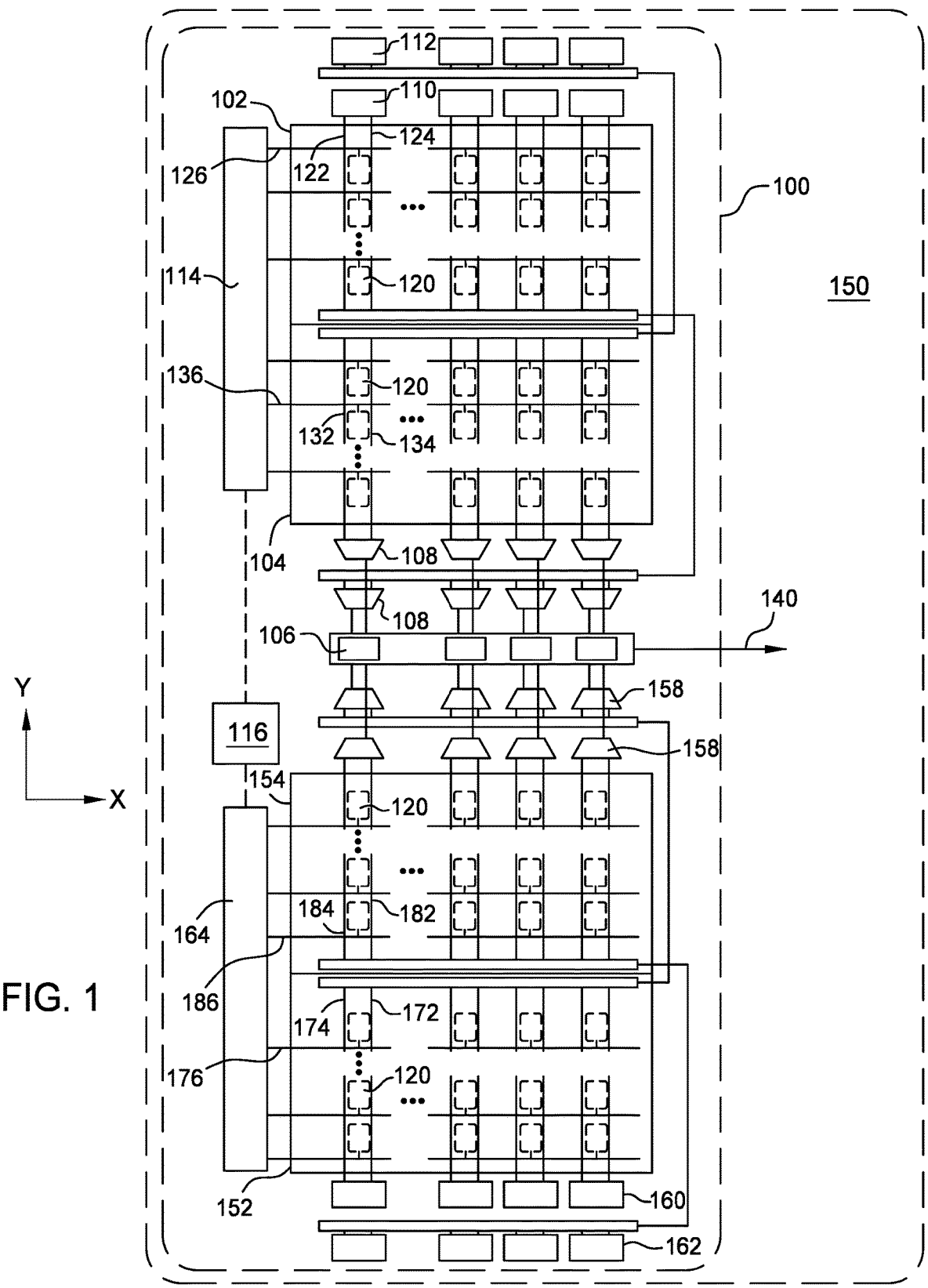
FIG. 1 is a schematic diagram of a memory device having arrays of semiconductor memory cells.

Turning now to FIG. 1, a memory device 100 is provided. The memory device 100 resides in an integrated circuit (IC) die 150. Although in FIG. 1 only one memory device 100 is shown within the IC die 150, it is to be understood that the IC die 150 may contain from one to in excess of a thousand memory devices 100.

The memory device 100 includes a first array 102 of semiconductor memory cells 120, a second array 104 of semiconductor memory cells 120, a plurality of sense amplifiers 106, a plurality of high ratio column multiplexers (MUXES) 108, a plurality of first drivers 110, a plurality of second drivers 112, word select logic circuitry 114, and memory controller circuitry 116. The memory cells 120 comprising each of the first and second arrays 102, 104 are arranged in grid having rows and columns. The columns of the memory cells 120 comprising the first array 102 are aligned with columns of the memory cells 120 comprising the second array 104. Although not required, the number columns memory cells 120 comprising the first array 102 are equal to the number columns memory cells 120 comprising the second array 104. In the example depicted in FIG. 1, the first array 102 includes 72 columns and 64 rows of memory cells 120, while the second array 104 also includes 72 columns and 64 rows of memory cells 120, yielding 4.5K (4608) memory cells 120 in each of the first and second arrays 102, 104. It is also contemplated that the arrays 102, 104 may have different numbers of rows and/or columns, and may optionally also have a different total number of memory cells 120.

In the first array 102, each of the memory cells 120 is coupled by bit lines 122, 124 to a respective one of the plurality of first drivers 110. Wordlines 126 also couple each memory cell 120 to the word select logic circuitry 114. The first drivers 110 and the word select logic circuitry 114 are coupled to memory controller circuitry 116. The memory controller circuitry 116 is configured to coordinate the timing and operation of the word select logic circuitry 114 and first drivers 110 such that each memory cell 120 within the first array 102 may be addressed, thus enabling reading data from, and writing data to, the addressed memory cell 120. The memory controller circuitry 116 is also configured to instruct the first drivers 110 when to drive a voltage on the bit lines 122, 124 to write data to the memory cells 120.

The sense amplifiers 106 are configured to read the data from the addressed memory cell 120. The memory cells 120 are coupled by the bit lines 122, 124 through the column MUXES 108. The column MUXES 108, in response on output instructions from the memory controller circuitry 116, couple the addressed memory cell 120 through the bit lines 122, 124 to the sense amplifiers 106.

In the example depicted in FIG. 1, the high ratio column MUXES 108 are configured as an 8:1 multiplexer. Alternatively, the column MUXES 108 have a higher input to output ratio, such as 16:1. The inputs of each column MUX 108 are connected to a respective one of the bit lines 122, 124. The output of each column MUX 108 is connected to a respective one of the sense amplifiers 106. Each column MUX 108 is also coupled to the memory controller circuitry 116 so that the selection of which bit line 122, 124 is connected to the sense amplifiers 106 can be selected so that the memory state of the addressed memory cell 120 may be read.

The sense amplifiers 106 have a data output 140 that outputs the bits read from the first array 102 of memory cells 120 as a WORD. In the example depicted in FIG. 1, the sense amplifiers 106 are configured to output a WORD from first array 102 having 9 bits.

Figure 2A:
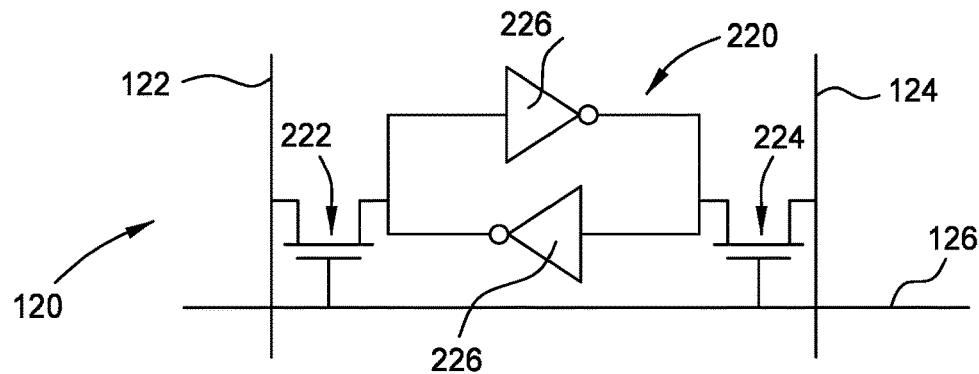
FIG. 2A is a schematic diagram of one example of semiconductor memory cell.

FIG. 2A is one example of the memory cell 120 configured as static random-access memory (SRAM). The memory cell 120 may also be configured as other types of solid state memory. The memory cell 120 includes first and second access transistors 222, 224 and a data storage cell 220. The data storage cell 220 may have any suitable configuration capable of maintaining a stored value. In one example, the data storage cell 220 includes a pair of inverters 226 that are cross-coupled such that the output of one inverter 226 becomes the input of the other inverter 226. As long as there is power, the value stored within the data storage cell 220 will be continuously reinforced by the positive feedback loop created by the cross-coupled inverters 226.

When the first and second access transistors 222, 224 are not energized, the data storage cell 220 remains isolated from the bit lines 122, 124 such that data (e.g., a 0 or 1 bit) is stored within the data storage cell 220. When the first and second access transistors 222, 224 are energized by voltage provided on the wordline 126 by the word select circuitry 114, the bit lines 122, 124 are coupled to the data storage cell 220. Once the data storage cell 220 is coupled to the bit lines 122, 124, data can be written to the data storage cell 220 using the voltage provided by one of the first drivers 110, or if the first drivers 110 do not output a voltage, the data from the data storage cell 220 is provided through the column MUX 108 to the sense amplifier 106.

Figure 2B:
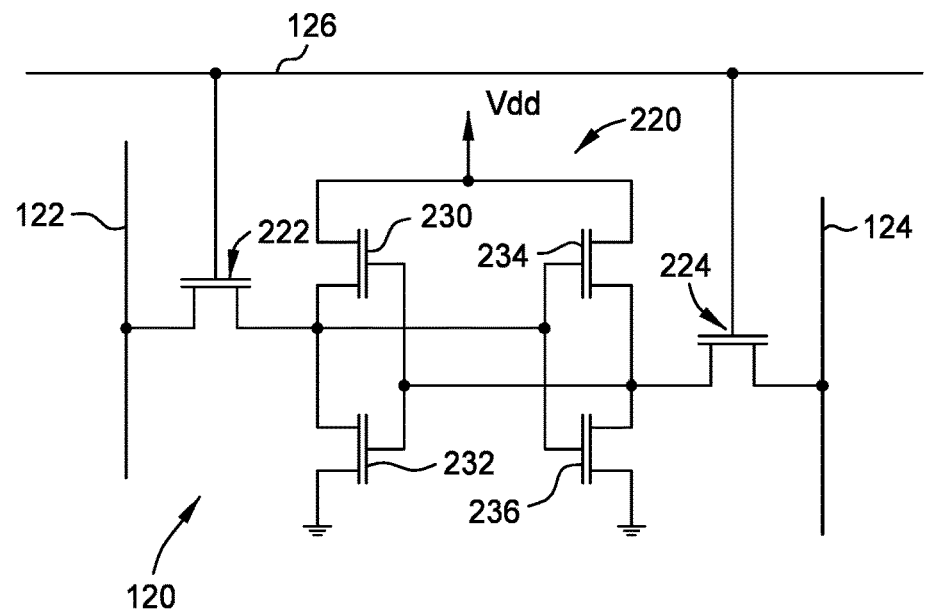
FIG. 2B is a schematic diagram of one example of semiconductor memory cell implemented as a six transistor static random-access memory (SRAM) structure.

FIG. 2B is another example of the memory cell 120 configured as SRAM. The memory cell 120 may also be configured as other types of solid state memory. The memory cell 120 includes first and second access transistors 222, 224 and a data storage cell 220. The data storage cell 220 includes four transistors 230, 232, 234, 236. The first and second access transistors 222, 224 have their respective sources coupled to the data storage cell 220, and have their respective drains coupled to bit lines 122, 124. Because the access transistors 222, 224 provide bi-directional current flow, it will be appreciated that the terms "source" and "drain" are somewhat arbitrary here and could be exchanged. The wordline 126 is coupled to the respective gate terminals of the access transistors 222, 224, wherein the wordline 126 is selectively asserted by the word select circuitry 114 to selectively couple the data storage cell 220 to bit lines 122, 124.

The drain of the first access transistor 222 is coupled to the gates of the second and fourth transistors 234, 236. The drain of the first access transistor 222 is also coupled to the drain of the first transistor 230 and the source of the second transistor 232. The drain of the second access transistor 224 is coupled to the gates of the first and second transistors 230, 232. The drain of the second access transistor 224 is also coupled to the drain of the third transistor 234 and the source of the fourth transistor 236.

When the first and second access transistors 222, 224 are not energized, the data storage cell 220 remains isolated from the bit lines 122, 124 such that data (e.g., a 0 or 1 bit) is stored within the data storage cell 220. When the first and second access transistors 222, 224 are energized by voltage provided on the wordline 126 by the word select circuitry 114, the bit lines 122, 124 are coupled to the drains of the first and third transistors 230, 234 of the data storage cell 220. Once the drains of the first and third transistors 230, 234 of the data storage cell 220 are coupled to the bit lines 122, 124, data can be written to the data storage cell 220 using the voltage provided by one of the first drivers 110, or if the first drivers 110 do not output a voltage, the data from the data storage cell 220 is provided through the column MUX 108 to the sense amplifier 106.

Figure 2C:
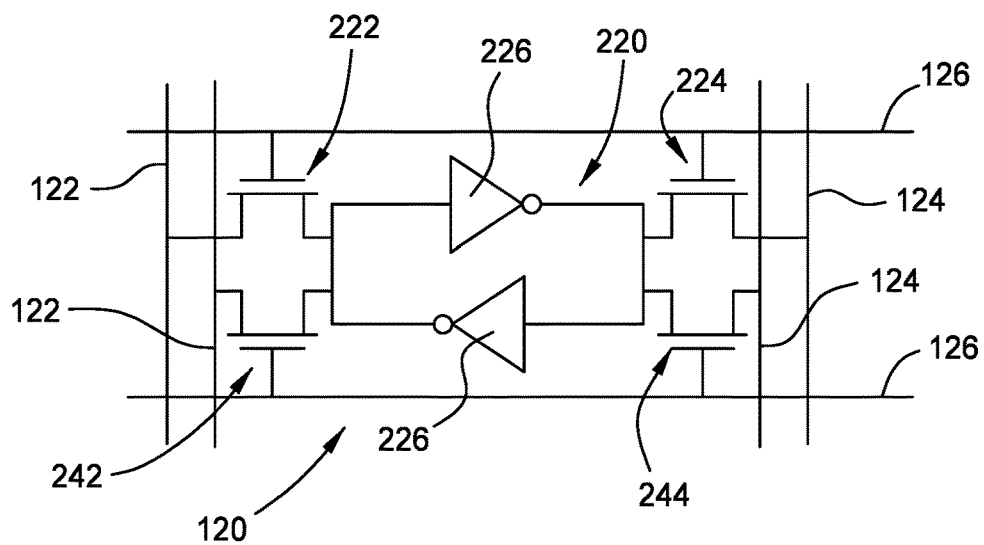
FIG. 2C is a schematic diagram of one example of semiconductor memory cell implemented as a dual port random-access memory (DPRAM) structure.

FIG. 2C is another example of the memory cell 120 configured as dual port static random-access memory (DPRAM). The memory cell 120 may also be configured as other types of solid state memory. The DPRAM memory cell 120 allows multiple reads or writes to occur at the same time, or nearly the same time. The DPRAM memory cell 120 includes four access transistors 222, 224, 242, 244 and a data storage cell 220. The data storage cell 220 may be configured as described above, or have another suitable configuration. The first and second access transistors 222, 224 have their respective drains coupled to the data storage cell 220, and have their respective sources coupled to bit lines 122, 124. A first wordline 126 is coupled to the respective gate terminals of the access transistors 222, 224. The third and fourth access transistors 242, 244 have their respective drains coupled to the data storage cell 220, and have their respective sources coupled to another set of bit lines 122, 124. A second wordline 126 is coupled to the respective gate terminals of the access transistors 242, 244.

Returning back to FIG. 1, the second array 104 is generally configured substantially identical to the first array 102, and is formed from common metal layers of the IC die 150 in which the arrays 102, 104 reside. In the second array 104, the memory cells 120 are each coupled by bit lines 132, 134 respectively to one of the plurality of second drivers 112. Wordlines 136 also couple each memory cell 120 to the word select logic circuitry 114. The second drivers 112 are coupled to the memory controller circuitry 116. The memory controller circuitry 116 is configured to coordinate the timing and operation of the word select logic circuitry 114 and second drivers 112 such that each memory cell 120 within the second array 104 may be addressed, thus enabling reading data from, and writing data to, the addressed memory cell 120 of the second array 104 independent from the read and write activities of the first array 102. The memory controller circuitry 116 is configured to instruct the second drivers 112 when to drive a voltage on the bit lines 132, 134 to write data to the memory cells 120 of the second array 104.

The sense amplifiers 106 are configured to read the data from the addressed memory cell 120 of the second array 104. The memory cells 120 are coupled by the bit lines 132, 134 through the column MUXES 108. The column MUXES 108, in response on output instructions from the memory controller circuitry 116, couple the addressed memory cell 120 of the second array 104 through the bit lines 132, 134 to the sense amplifiers 106.

The data output 140 of the sense amplifiers 106 outputs the bits provided by the second array 104 of memory cells 120 as a WORD. In the example depicted in FIG. 1, the sense amplifiers 106 of the second array 104 are configured to output a WORD having 9 bits. Thus, if only one of the first and second arrays 102, 104 are addressed by the memory controller circuitry 116, the sense amplifiers 106 of the memory device 100 output a WORD having 9 bits, which desirably reduces the power consumed by the memory device 100 as only half of the memory device 100 is being operated. However, if both of the first and second arrays 102, 104 are addressed by the memory controller circuitry 116, the sense amplifiers 106 of the memory device 100 output a WORD having 18 bits. Thus, the memory device 100 has the ability to provide a 9 bit or 18 bit output mode, with desirably a reduced power consumption when operating in a 9 bit output mode.

In the example illustrated in FIG. 1, the first array 102 and the second array 104 reside in the same metal layers of the IC die 150. The second array 104 is disposed between the sense amplifiers 106 and the first array 102. In order for the bit lines 122, 124 of the first array 102 to reach the sense amplifiers 106, a portion of the bit lines 122, 124 disposed between the last row of memory cells 120 and the sense amplifiers 106 pass over the memory cells 120 of the second array 104. The bit lines 122, 124 pass over the memory cells 120 of the second array 104 using a different metal layer (i.e., a higher and/or lower metal layer) than used the bit lines 122, 124 coupled to the memory cells 120 of the second array 104. When a portion of the bit lines 122, 124 of the first array 102 reside in a different metal layer than the bit lines 122, 124 of the second array 104, the column MUXES 108 coupled to the first array 102 may be formed at least partially in a metal layer other than the metal layers in which the column MUXES 108 coupled to the other array is formed. In one example, the column MUXES 108 coupled to one array may be stacked on top of the column MUXES 108 coupled to the other array. As the bit lines 122, 124 in the second array 104 are shorter, they have less capacitive coupling as compared to bit lines extending the full height (e.g., all the rows) of a memory device (as conventionally found). Less capacitive coupling desirably results in improved performance and less power consumption. Additionally, as an 18 bit output can be realized from two arrays of memory cells 120 having 64 rows each, the horizontal space required to accommodate a 18 bit output using 8:1 column MUXES is reduced as compared to an arrangement having a single 9K (9×1024) memory cell array. Thus, an 18 bit output architecture is enabled using the twin 4.5K memory cell arrays 102, 104 without growth in the width of the memory device 100 as would been required in an 18 bit output, 9K memory cell single array architecture.

The memory device 100 may also be configured to have a 27 bit output and/or a 36 bit output by adding a third array and/or forth array of memory cells 120. By operation only the arrays needed to provide the number of bits desired in the output 140, the amount of power consumed by the memory device 100 can be reduced should a lower bit number WORD output be desired.

In the example depicted in FIG. 1, the memory device 100 may optionally also include a third array 152 and fourth array 154 of memory cells 120. The third array 152 and the fourth array 154 of memory cells 120 are generally configured in the mirror image of the first and second arrays 102, 104 of memory cells 120.

The third array 152 is separated from the sense amplifiers 106 by the fourth array 154. The third array 152 and the fourth array 154 of memory cells 120 are generally coplanar within the IC die 150. The third array 152 and the fourth array 154 of memory cells 120 separated from the first and second arrays 102, 104 of memory cells 120 by the sense amplifiers 106.

As with the first and second arrays 102, 104, the memory cells 120 of the third and fourth arrays 152, 154 are arranged in grid having rows and columns. The columns of the memory cells 120 comprising the third array 152 are aligned with columns of the memory cells 120 comprising the fourth array 154. The columns of the third array 152 are also aligned with the columns of the first and second arrays 102, 104. In the example depicted in FIG. 1, each of the third and fourth arrays 152, 154 include 72 columns and 64 rows of memory cells 120, yielding 4.5K (4608) memory cells 120 in each of the third and fourth arrays 152, 154. It is also contemplated that the third and fourth arrays 152, 154 may have different numbers of rows and/or columns, and may optionally also have a different total number of memory cells 120.

In the third array 152, the memory cells 120 are each coupled by bit lines 172, 174 respectively to one of the plurality of third drivers 160. Wordlines 176 also couple each memory cell 120 to the word select logic circuitry 114. The third drivers 160 and the word select logic circuitry 114 are coupled to the memory controller circuitry 116. The memory controller circuitry 116 is configured to coordinate the timing and operation of the word select logic circuitry 114 and third drivers 160 such that each memory cell 120 within the third array 152 may be addressed, thus enabling reading data from, and writing data to, the addressed memory cell 120. The memory controller circuitry 116 is configured to instruct the third drivers 160 when to drive a voltage on the bit lines 172, 174 to write data to the memory cells 120 of the third array 152.

The memory cells 120 of the third array 152 are coupled by the bit lines 172, 174 through the column MUXES 108 to the sense amplifiers 106. The column MUXES 108, in response on output instructions from the memory controller circuitry 116, couple the addressed memory cell 120 of the third array 152 through the bit lines 172, 174 to the sense amplifiers 106. In the example depicted in FIG. 1, the column MUXES 108 are configured as an 8:1 multiplexer. The inputs of each MUX 108 is connected to one of the bit lines 172, 174. The output of each column MUX 108 is connected to one of the sense amplifiers 106. Each column MUX 108 is also coupled to the memory controller circuitry 116 so that the selection of which bit line 172, 174 is connected to the sense amplifiers 106 can be selected so that the memory state of the addressed memory cell 120 of the third array 152 may be read. In the example depicted in FIG. 1, the sense amplifiers 106 are configured to output a WORD from third array 152 having 9 bits.

The fourth array 154 is generally configured substantially identical to the third array 152, and formed from common metal layers of the IC die 150 in which the arrays 102, 104, 152 reside. In the fourth array 154, the memory cells 120 are each coupled by bit lines 182, 184 to one of the plurality of fourth drivers 162. Wordlines 186 also couple each memory cell 120 of the fourth array 154 to the word select logic circuitry 114. The fourth drivers 162 are coupled to the memory controller circuitry 116. The memory controller circuitry 116 is configured to coordinate the timing and operation of the word select logic circuitry 114 and the fourth drivers 162 such that each memory cell 120 within the fourth array 154 may be addressed, thus enabling reading data from, and writing data to, the addressed memory cell 120 of the fourth array 154 independent from the read and write activities of the first, second, third arrays 102, 104, 152. The memory controller circuitry 116 is configured to instruct the fourth drivers 162 when to drive a voltage on the bit lines 182, 184 to write data to the memory cells 120 of the fourth array 154.

The sense amplifiers 106 are configured to read the data from the addressed memory cell 120 of the fourth array 154. The memory cells 120 are coupled by the bit lines 182, 184 through the column MUXES 108. The column MUXES 108, in response on output instructions from the memory controller circuitry 116, couple the addressed memory cell 120 of the fourth array 154 through the bit lines 182, 184 to the sense amplifiers 106.

The data output 140 of the sense amplifiers 106 outputs the bits provided by the fourth array 154 of memory cells 120 as a WORD. In the example depicted in FIG. 1, the sense amplifiers 106 of the fourth array 154 are configured to output a WORD having 9 bits. Accordingly, if only one of the arrays 102, 104, 152, 154 are addressed by the memory controller circuitry 116, the sense amplifiers 106 of the memory device 100 output a WORD having 9 bits. If only two of the arrays 102, 104, 152, 154 are addressed by the memory controller circuitry 116, the sense amplifiers 106 of the memory device 100 output a WORD having 18 bits. If only three of the arrays 102, 104, 152, 154 are addressed by the memory controller circuitry 116, the sense amplifiers 106 of the memory device 100 output a WORD having 27 bits. If all of the arrays 102, 104, 152, 154 are addressed by the memory controller circuitry 116, the sense amplifiers 106 of the memory device 100 output a WORD having 36 bits. Thus, the number of bits in the WORD output by the sense amplifiers 106 of the memory device 100 may be selected, which enables better performance and power consumption to be optimized for the bit size output as compared to conventional memory devices which essentially the same performance and power consumption no matter the bit size of the output.

In the example illustrated in FIG. 1, the third array 152 and the fourth array 154 reside in the same metal layers of the IC die 150. The fourth array 154 is disposed between the sense amplifiers 106 and the third array 152. In order for the bit lines 172, 174 of the third array 152 to reach the sense amplifiers 106, a portion of the bit lines 172, 174 disposed between the last row of memory cells 120 and the sense amplifiers 106 pass over the memory cells 120 of the fourth array 154. The bit lines 172, 174 can pass over the memory cells 120 of the fourth array 154 by residing in a different metal layer than the bit lines 182, 184 coupled to the memory cells 120 of the fourth array 154. As the bit lines 182, 184 in the fourth array 154 are shorter, they have less capacitive coupling as compared to bit lines extending the full height (e.g., all the rows) of the memory device 100. Less capacitive coupling desirably results in improved performance and less power consumption.

Figure 3:
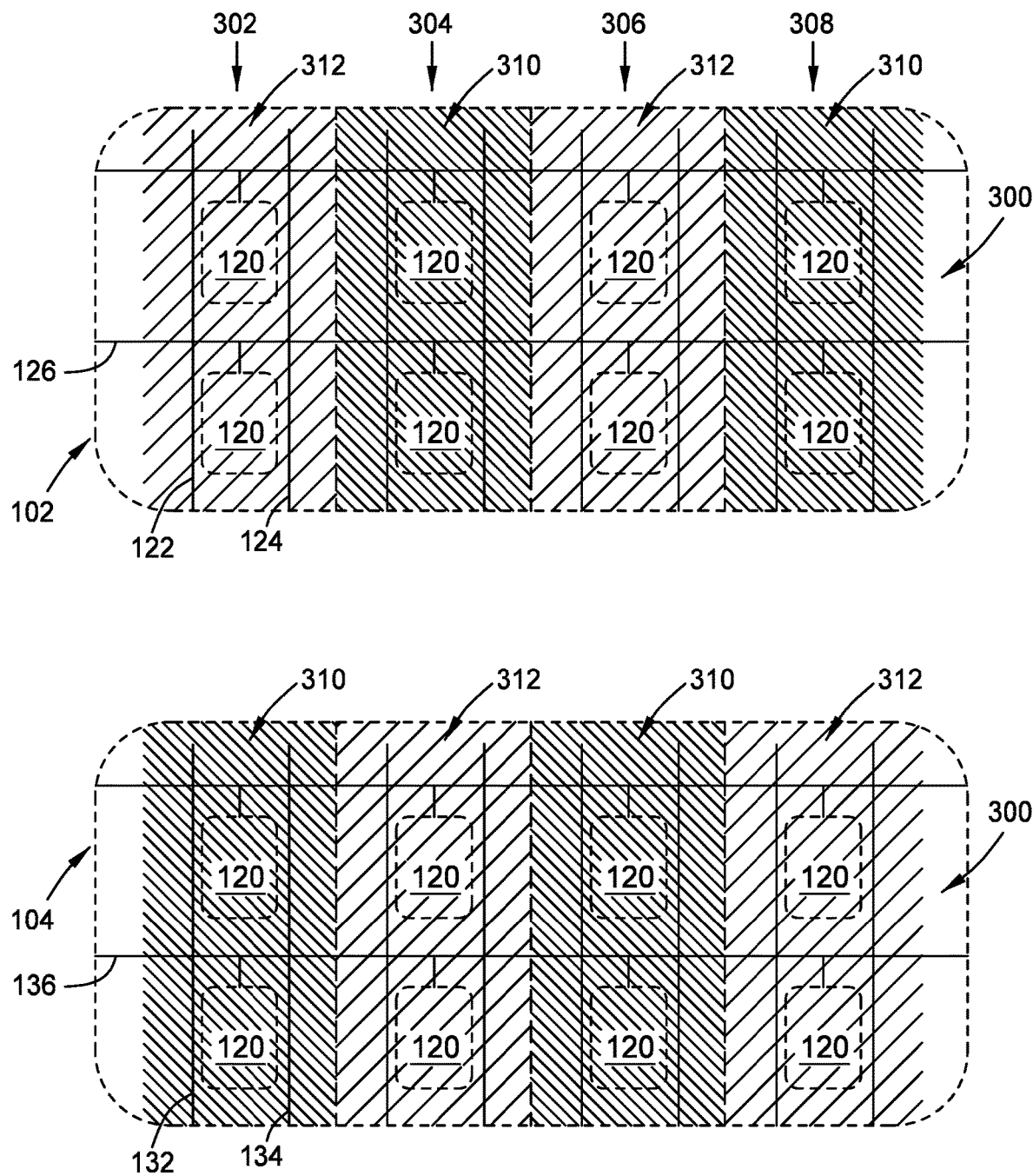
FIG. 3 is a schematic diagram of a portion of two memory arrays of the memory device of FIG. 1.

FIG. 3 is a schematic diagram of a portion of two memory arrays of the memory device 100 of FIG. 1. In FIG. 3, portions of the memory arrays 102, 104, with the memory cells 120 of both arrays 102, 104 are aligned in common columns. Four columns 302, 304, 306, 308 are shown in FIG. 3 for convenience. The memory cells 120 formed on one of P or N doped region of a substrate 300 are shown in lightly hatched regions (first region 310), while memory cells 120 formed on the other of P or N doped region of the substrate 300 are shown in a tighter hatched regions (second region 312). If the first region 310 designates a P-substrate, then the second region 312 designates an N-substrate. Conversely, if the first region 310 designates an N-substrate, then the second region 312 designates a P-substrate.

As shown in FIG. 3, each first region 310 within a common row of memory cells 120 is separated by a second region 312. Within an array, all the memory cells 120 within the same column are formed on a region (310 or 312) having the same type of substrate dopant. For example in the first array 102, all of the memory cells 120 of the column 302 are formed on the second region 312, all of the memory cells 120 of the column 304 are formed on the first region 310, all of the memory cells 120 of the column 306 are formed on the second region 312, and all of the memory cells 120 of the column 308 are formed on the first region 310.

However, the regions 310, 312 of the second array 104 are shifted laterally (e.g., in the x-direction) relative to the regions 310, 312 of the first array 102. For example, all of the memory cells 120 within column 302 of the first array 102 are formed on the second region 312, but the all of the memory cells 120 within column 302 of the second array 104 are formed on the first region 310. In this manner, energized particle strikes to the first region 310 of column 302 in the second array 104 are much less likely to corrupt memory cells 120 within the same column 302 of the first array 102 as the memory cells 120 in column 302 of the first array 102 are formed on the second region 312 because of the different type of substrate doped impedes the propagation of charge through the substrate 300. The result is that within a column, SEU events are less likely to occur across both arrays 102, 104 as a result of a particle strike.

Figure 4:
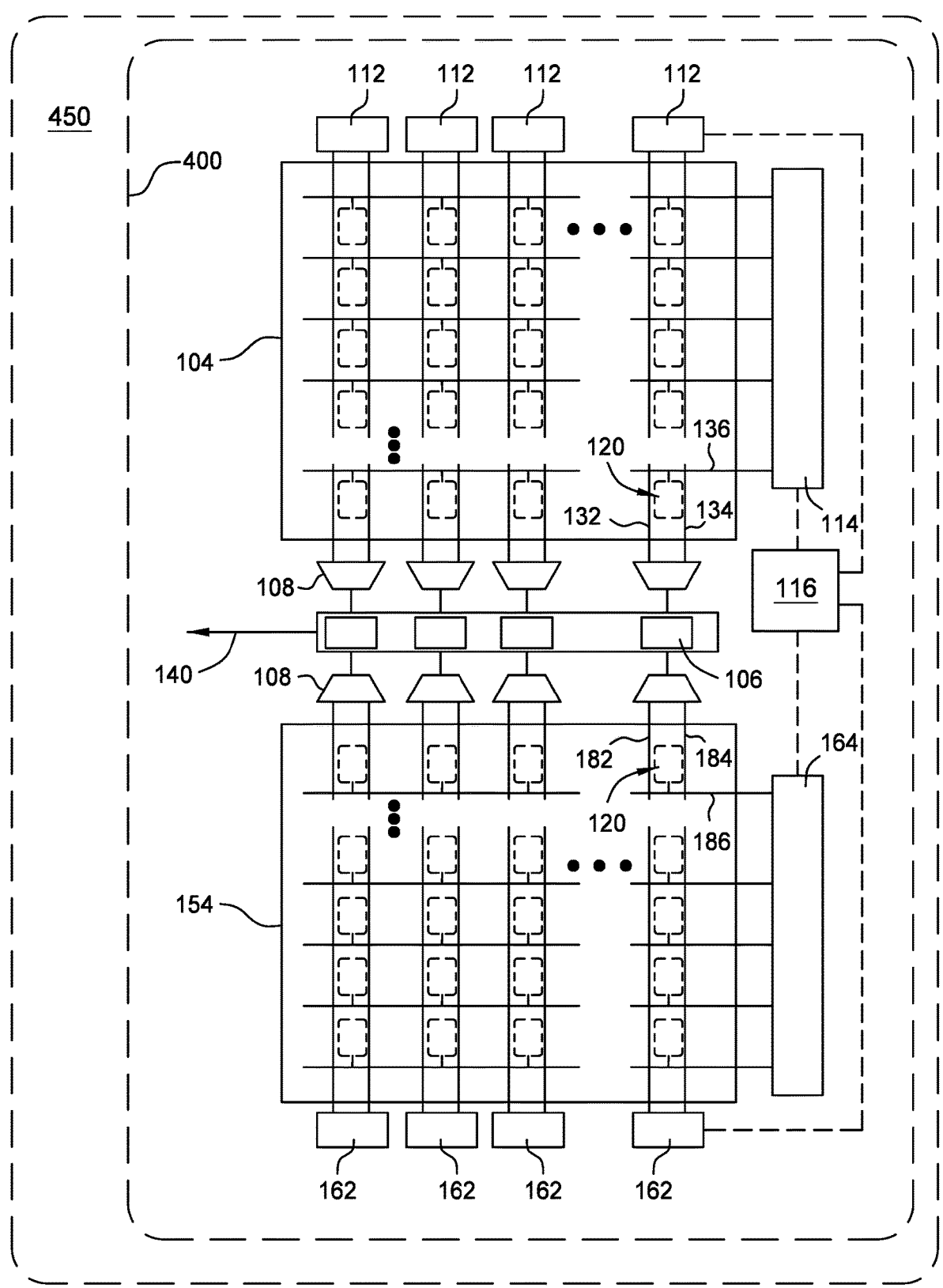
FIG. 4 is a schematic diagram of another memory device having arrays of semiconductor memory cells.

FIG. 4 is a schematic diagram of another memory device 400 having arrays of semiconductor memory cells 120. In the example depicted in FIG. 4, the memory device 400 resides in an integrated circuit (IC) die 450. Although in FIG. 4 only one memory device 400 is shown within the IC die 450, it is to be understood that the IC die 450 may contain from one to in excess of a thousand memory devices 400.

The memory device 400 is generally configured identical to the memory device 100, except that the first and third arrays 102, 152 have been removed. Thus, the second array 104 of memory cells 120 resides on one side of the sense amplifiers 106 and the fourth array 154 of memory cells 120 resides on the other side of the sense amplifiers 106. As with the memory device 100, the columns of memory cells 120 in the second and fourth arrays 104, 154 are aligned.

The memory cells 120 of the second and fourth arrays 104, 154 are aligned in common columns. The bit lines 132, 134, 182, 184 memory cells 120 of the second and fourth arrays 104, 154 are coupled to the sense amplifiers 106 via 8:1 MUXES 108. The memory cells 120 of the second and fourth arrays 104, 154 are coupled to a plurality of first drivers 110, a plurality of second drivers 112, word select logic circuitry 114, and memory controller circuitry 116 as described above.

In the example depicted in FIG. 1, the second array 104 includes 128 columns and 64 rows of memory cells 120, and the fourth array 154 also includes 128 columns and 64 rows of memory cells 120, yielding 4500 memory cells 120 in each of the arrays 104, 154. It is also contemplated that the arrays 102, 104 may have different numbers of rows and/or columns, and may optionally also have a different total number of memory cells 120.

The data output 140 of the sense amplifiers 106 of the memory device 400 outputs the bits provided by the second array 104 and the fourth array 154. In the example depicted in FIG. 4, the sense amplifiers 106 coupled to the second array 104 are configured to output a WORD having 9 bits, and the sense amplifiers 106 coupled to the fourth array 154 are also configured to output a WORD having 9 bits. Thus, if only one of the second and fourth arrays 104, 154 are addressed by the memory controller circuitry 116, the sense amplifiers 106 of the memory device 100 output a WORD having 9 bits, which desirably reduces the power consumed by the memory device 400 as only half of the memory device 400 is being operated. However, if both of the second and fourth arrays 104, 154 are addressed by the memory controller circuitry 116, the sense amplifiers 106 of the memory device 400 output a WORD having 18 bits. Thus, the memory device 400 has the ability to operate in a 9 bit or 18 bit output mode, with desirably a reduced power consumption when operating in a 9 bit output mode.

Figure 5:
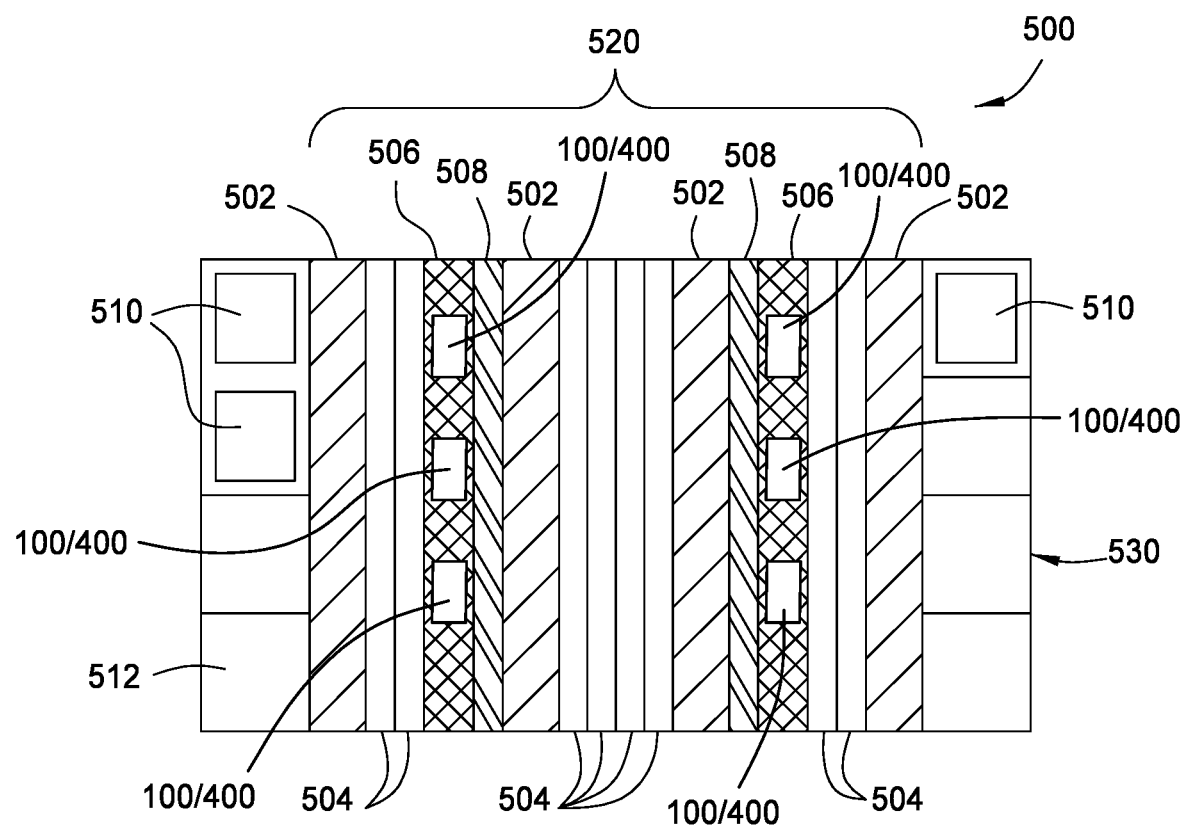
FIG. 5 is a schematic diagram of an integrated circuitry die having arrays of semiconductor memory cells.

FIG. 5 is a schematic diagram of an integrated circuitry (IC) die 500 having one or more memory devices that include arrays of semiconductor memory cells 120. The memory devices may be configured as the memory devices 100 and/or 400 described above.

The IC die 500 generally includes a body 530. Although the body 530 may have any suitable shape, the body 530 is shown in an exemplary rectangular form in FIG. 5. In one embodiment, the IC die 500 is configured as a field programmable gate array (FPGA) die. The circuitry disposed in the body 530 of the FPGA die includes a large number of different programmable tiles 520 including one or more of multi-gigabit transceivers ("MGTs"), configurable logic elements ("CLEs"), random access memory blocks ("BRAMs"), input/output blocks ("IOBs"), configuration and clocking logic ("CONFIG/CLOCKS"), digital signal processing blocks ("DSPs"), specialized input/output blocks ("I/O") (e.g., configuration ports and clock ports), and other programmable logic such as digital clock managers, analog-to-digital converters, system monitoring logic, and so forth.

Some FPGA dies also include dedicated processor blocks ("PROC"). Examples of FPGA dies having programmable tiles 520 are available from Advanced Micro Devices, Inc., of San Jose, California, among other manufacturers.

In one example, the programmable tiles 520 of the IC die 500 includes at least one or more distributed configurable logic elements (CLE) tile(s) 504. The CLE tiles 504 are the main resources for implementing general-purpose combinatorial and sequential circuits of the IC die 500. Each CLE tile 504 is made up of the logic elements, which are grouped together in a slice, along with the interconnect routing resources to connect the logic elements. The CLE tiles 504 are arranged in columns throughout the body 530 of the IC dies 500.

Exemplary circuit elements of each CLE tile 504 provides high-performance, low-power programmable logic and may include one or more of logical function generators such as look up tables (LUTs), storage elements, distributed memory and shift register logic (SRL), and multiplexers, and carry logic. The storage elements may include a description of and controls for the latches and flip-flops contained in the CLE tile 504. Dedicated storage elements can be configured as flip-flops or latches with flexible control signals. The carry logic may include dedicated gates that can be cascaded to implement efficient arithmetic functions. The above is just one example of many circuit configurations for a CLE tile that may be utilized with the IC die 500.

The programmable tiles 520 of the IC die 500 may also include at least one or more distributed virtual network on chip (VNOC) tile(s) 502. The VNOC tiles 502 having inputs connected outputs of other tiles, such as the CLE tiles 504, among others, and outputs connected to micro-bumps (discussed further below with reference to FIG. 2) disposed on the outer surface of the die body 530. Similar to the CLE tiles 504, the VNoC tiles 502 are arranged in columns throughout the body 530 of the IC dies 500.

Each VNOC tile 502 comprises switching circuitry and logic that enable routers to route signals from the adjacent tiles (such as CLE tiles) of the IC die 500 to another FPGA die within a chip package assembly. The switching circuitry of the VNOC tiles 502 may include at least one or more of multiplexers, buffers, crossbar switches and arbiters. The above is just one example of many circuit configurations for a VNoC tile may be utilized with the IC die 500.

The programmable tiles 520 of the IC die 500 may also include one or more other tiles generically referred to as miscellaneous tiles 506, 508. The miscellaneous tiles 506, 508 may include one or more of MGT tiles, the random access memory blocks BRAM tiles, IOB tiles, CONFIG/CLOCKS tiles, and DSP tiles. Such miscellaneous tiles 506, 508 are conventionally known. The location of any of the miscellaneous tiles 506, 508 relative to the VNoC tiles 502 and CLE tiles 504 may vary as desired. For example, the relative location of the tiles 520 within the die body 530 shown in FIG. 5 is purely for illustrative purposes, and other locations of one type of tiles relative to another type of tile may be utilized.

At least some of the miscellaneous tiles 506 include memory devices. As indicated above, the memory devices may be configured as one or both of the memory devices 100, 400 described above.

The IC die 500 may also include input/output (I/O) blocks 510 and power management controller (PMC) blocks 512, among others. One or both of the I/O and PMC blocks 510, 512 may be located along the periphery of the die body 530.

Figure 6:
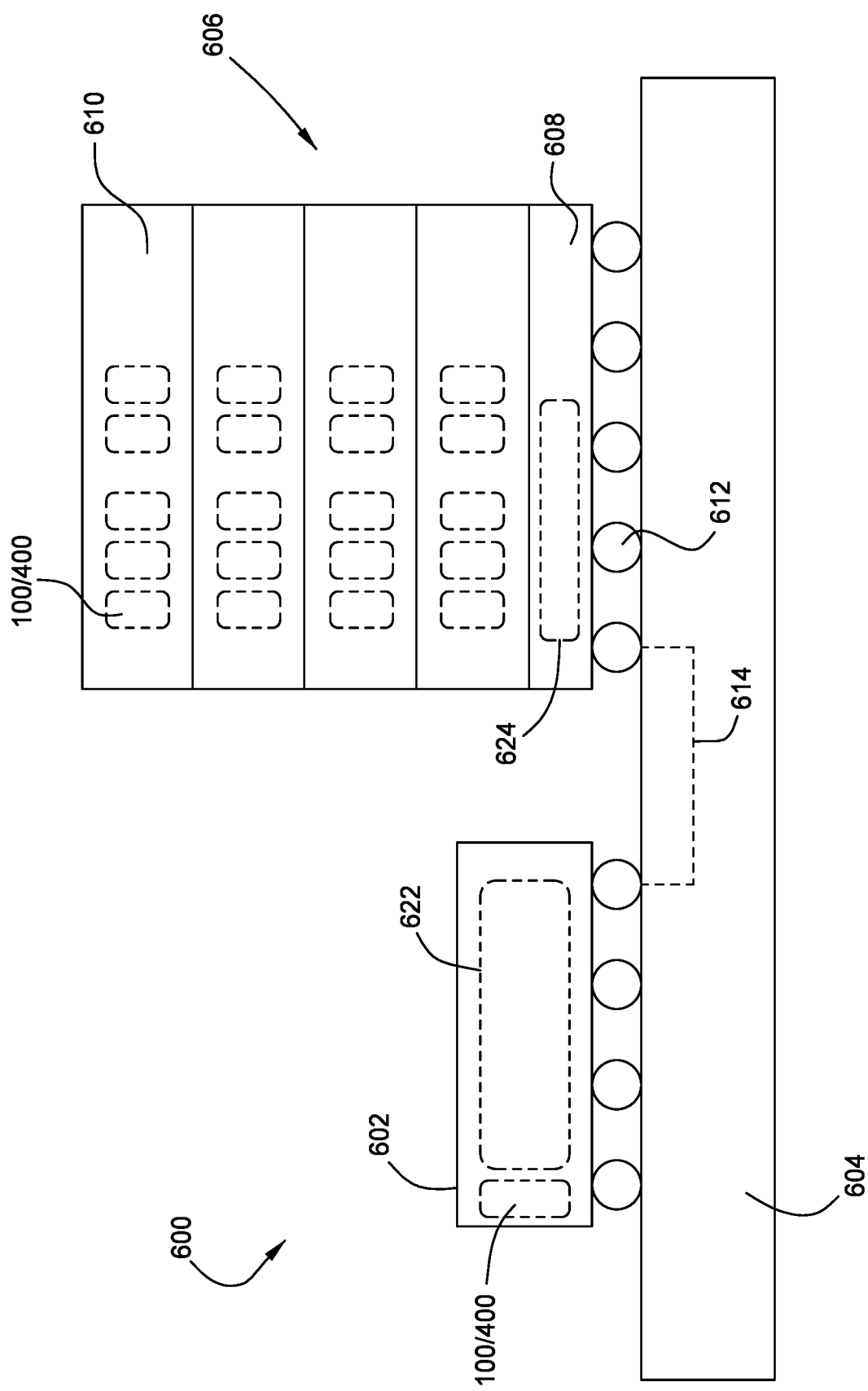
FIG. 6 is a schematic diagram of chip package having last one integrated circuitry die that includes an arrays of semiconductor memory cells.

FIG. 6 is a schematic diagram of chip package 600 having one or more IC dies, on or more of which include memory devices having arrays of semiconductor memory cells 120. The memory devices present in one or more of the IC dies the may be configured as one or both of the memory devices 100, 400 described above.

In the example of FIG. 6, the chip package 600 includes at least a first integrated circuit (IC) die 602 disposed on a package substrate 602. Although not shown in FIG. 6, an interposer and/or a redistribution layer may be disposed between the first IC die 602 and the substrate 604. The first IC die 602 generally includes functional circuitry 622, and optionally, one or more memory devices 100/400. The functional circuitry 622 is coupled to routing circuitry 614 formed in the package substrate 602.

The functional circuitry 622 may include block random access memory (BRAM), UltraRAM (URAM), digital signal processing (DSP) blocks, configurable logic elements (CLEs), and the like. The BRAM may be configured as one or both of the memory devices 100, 400 described above. The first IC die 602 may be, but are not limited to, programmable logic devices, such as field programmable gate arrays (FPGA), memory devices, such as high band-width memory (HBM), optical devices, processors or other IC logic structures. The first IC die 602 may optionally include optical devices such as photo-detectors, lasers, optical sources, and the like. In some examples, the first IC die 602 is a logic die having math processor (also known as math engine) circuitry for accelerating machine-learning math operations in hardware, such as self-driving cars, artificial intelligence and data-center neural-network applications. In another example, the first IC die 602 is a logic die. The first IC die 602 may be vertically stacked with the other IC dies.

In the example depicted in FIG. 6, the chip package 600 is configured as a high bandwidth memory device. Thus, in addition the first IC die 602, a memory stack 606 is also coupled to the substrate 604. The first IC die 602 provides the logic function to control the operation of memory devices 100/400 disposed within the memory stack 606.

The memory stack 606 includes an I/O die 608 that is coupled to the substrate 604. The I/O die 608 communicates with the first IC die 602 via the routing circuitry 614 formed in the package substrate 602. A plurality of memory dies 610 are stacked on the I/O die 608. Each of the memory dies 610 include a plurality of memory devices. The memory devices disposed in the memory dies 610 may be configured as one or both of the memory devices 100, 400 described above.

Thus, memory devices, IC dies and chip packages have been described that includes high ratio column MUXES for communicating between the arrays of memory cells and sense amplifiers of the memory devices. The high ratio column MUXES improves SEU resistance of the memory devices, particularly at technology nodes such as 5 nm, 3 nm, and below. The memory devices are arranged to enable different bit WORD outputs using less power when operating as lower bit outputs. The memory devices are also arranged to limit growth in the row direction, which facilitates floor planning of IC die designs. In some examples, bit lines are shortened as compared to conventional memory arrays, which reduces capacitive coupling, increases performance and reduces power consumption. Other examples having increased SEU resistance by offsetting P and N-doped regions in the columns of memory cells across two stacked arrays. As a result, the memory devices described herein have improved SEU resistance with reduced impact on performance and power consumption as compared to conventional memory arrays configured at sub-5 nm technology node.

While the foregoing is directed to embodiments of the present invention, other and further embodiments of the invention may be devised without departing from the basic scope thereof, and the scope thereof is determined by the claims that follow.

What is claimed is:

1. A semiconductor memory device comprising:
a first array of semiconductor memory cells arranged in rows and columns, each memory cell including a pair of access transistors that are coupled to a data storage cell of the memory cell;
a second array of semiconductor memory cells arranged in rows and columns, each memory cell including a pair of access transistors that are coupled to a data storage cell of the memory cell, the columns of the first array of semiconductor memory cells aligned with the columns of the second array of semiconductor memory cells;
a plurality of sense amplifiers configured to read data states from the first array of memory cells and the second array of memory cells, the plurality of sense amplifiers configured to output a word based on the read data states of the first and second arrays of semiconductor memory cells; and
a first plurality of high ratio column MUXES connecting bit lines of the first array of memory cells and the second array of memory cells to the plurality of sense amplifiers such that each pair of adjacent bit lines is coupled to a different sense amplifier.

2. The semiconductor memory device of claim 1, wherein bit lines coupled to the first array of semiconductor memory cells extend over the second array of semiconductor memory cells.

3. The semiconductor memory device of claim 2, wherein the first array of semiconductor memory cells and the second array of semiconductor memory cells each include approximately 4608 memory cells.

4. The semiconductor memory device of claim 2, wherein a first portion of the first plurality of high ratio column MUXES is formed using at least some metal layers that are not utilized by a second portion of the plurality of high ratio column MUXES.

5. The semiconductor memory device of claim 4, wherein the first portion of the first plurality of high ratio column MUXES is stacked above the second portion of the plurality of high ratio column MUXES.

6. The semiconductor memory device of claim 1 further comprising:
a first set of drivers coupled only to the semiconductor memory cells of the first array; and
a second set of drivers only coupled to the semiconductor memory cells of the second array.

7. The semiconductor memory device of claim 1, wherein semiconductor memory cells aligned in a first column spanning the first array and the second array are formed on one of a P or N-doped region of a substrate in the first array, and the other of the P or N-doped region of the substrate in the second array.

8. The semiconductor memory device of claim 1, wherein the sense amplifiers are configured to selectively output a WORD having 9 bits when operating one of the first or second arrays, and to output a WORD having 18 bits by operating both of the first and second arrays.

9. The semiconductor memory device of claim 1, wherein the plurality of sense amplifiers separate the first and second arrays of semiconductor memory cells.

10. The semiconductor memory device of claim 1 further comprising:
a third array of semiconductor memory cells arranged in rows and columns, each memory cell including a pair of access transistors that are coupled to a data storage cell of the memory cell;
a fourth array of semiconductor memory cells arranged in rows and columns, each memory cell including a pair of access transistors that are coupled to a data storage cell of the memory cell, the columns of the third array of semiconductor memory cells aligned with the columns of the fourth array of semiconductor memory cells, the third and fourth arrays of semiconductor memory cells together configured to output an 18 BIT word; and
a second plurality of high ratio column MUXES connecting bit lines of the third array of memory cells and the fourth array of memory cells to the plurality of sense amplifiers.

11. The semiconductor memory device of claim 10, wherein the sense amplifiers are configured to selectively output a WORD having:
9 bits when operating one of the first, second, third or fourth arrays;
18 bits by operating two of the first, second, third or fourth arrays;
27 bits by operating three of the first, second, third or fourth arrays; and
36 bits by operating all of the first, second, third and fourth arrays.

12. A semiconductor memory device comprising:
a first array of semiconductor memory cells arranged in rows and columns, each memory cell including a pair of access transistors that are coupled to a data storage cell of the memory cell;
a second array of semiconductor memory cells arranged in rows and columns, each memory cell including a pair of access transistors that are coupled to a data storage cell of the memory cell, the columns of the first array of semiconductor memory cells aligned with the columns of the second array of semiconductor memory cells, wherein bit lines coupled to the first array of semiconductor memory cells extend over the second array of semiconductor memory cells;
a plurality of sense amplifiers configured to read data states from the first array of memory cells and the second array of memory cells, the plurality of sense amplifiers configured to output a word based on the read data states of the first and second arrays of semiconductor memory cells, the first and second arrays of semiconductor memory cells disposed on a common side of the plurality of sense amplifiers; and
a first plurality of high ratio column MUXES connecting bit lines of the first array of memory cells and the second array of memory cells to the plurality of sense amplifiers.

13. The semiconductor memory device of claim 12, wherein the first array of semiconductor memory cells and the second array of semiconductor memory cells each include approximately 4608 memory cells.

14. The semiconductor memory device of claim 12 further comprising:
a first set of drivers coupled only to the semiconductor memory cells of the first array; and
a second set of drivers only coupled to the semiconductor memory cells of the second array.

15. The semiconductor memory device of claim 12, wherein semiconductor memory cells aligned in a first column spanning the first array and the second array are formed on one of a P or N-doped region of a substrate in the first array, and the other of the P or N-doped region of the substrate in the second array.

16. The semiconductor memory device of claim 12, wherein the sense amplifiers are configured to selectively output a WORD having 9 bits when operating one of the first or second arrays, and to output a WORD having 18 bits by operating both of the first and second arrays.

17. The semiconductor memory device of claim 12 further comprising:
a third array of semiconductor memory cells arranged in rows and columns, each memory cell including a pair of access transistors that are coupled to a data storage cell of the memory cell;
a fourth array of semiconductor memory cells arranged in rows and columns, each memory cell including a pair of access transistors that are coupled to a data storage cell of the memory cell, the columns of the third array of semiconductor memory cells aligned with the columns of the fourth array of semiconductor memory cells, the third and fourth arrays of semiconductor memory cells together configured to output an 18 BIT word; and
a second plurality of high ratio column MUXES connecting bit lines of the third array of memory cells and the fourth array of memory cells to the plurality of sense amplifiers.

18. The semiconductor memory device of claim 17, wherein the sense amplifiers are configured to selectively output a WORD having:
9 bits when operating one of the first, second, third or fourth arrays;
18 bits by operating two of the first, second, third or fourth arrays;
27 bits by operating three of the first, second, third or fourth arrays; and
36 bits by operating all of the first, second, third and fourth arrays.

19. A semiconductor memory device comprising:
a first array of semiconductor memory cells arranged in rows and columns, each memory cell including a pair of access transistors that are coupled to a data storage cell of the memory cell;
a second array of semiconductor memory cells arranged in rows and columns, each memory cell including a pair of access transistors that are coupled to a data storage cell of the memory cell, the columns of the first array of semiconductor memory cells aligned with the columns of the second array of semiconductor memory cells, wherein bit lines coupled to the first array of semiconductor memory cells extend over the second array of semiconductor memory cells;
a plurality of sense amplifiers configured to read data states from the first array of memory cells and the second array of memory cells, the plurality of sense amplifiers configured to output a word based on the read data states of the first and second arrays of semiconductor memory cells, the first and second arrays of semiconductor memory cells disposed on a common side of the plurality of sense amplifiers, the sense amplifiers configured to selectively output a WORD having 9 bits when operating one of the first or second arrays, and to output a WORD having 18 bits by operating both of the first or second arrays;
a first plurality of 8:1 column MUXES connecting bit lines of the first array of memory cells and the second array of memory cells to the plurality of sense amplifiers; and
wherein semiconductor memory cells aligned in a first column spanning the first array and the second array are formed on one of a P or N-doped region of a substrate in the first array, and the other of the P or N-doped region of the substrate in the second array.

20. The semiconductor memory device of claim 19 further comprising:
a third array of semiconductor memory cells arranged in rows and columns, each memory cell including a pair of access transistors that are coupled to a data storage cell of the memory cell;
a fourth array of semiconductor memory cells arranged in rows and columns, each memory cell including a pair of access transistors that are coupled to a data storage cell of the memory cell, the columns of the third array of semiconductor memory cells aligned with the columns of the fourth array of semiconductor memory cells, the third and fourth arrays of semiconductor memory cells together configured to output an 18 BIT word;
a second plurality of 8:1 column MUXES connecting bit lines of the third array of memory cells and the fourth array of memory cells to the plurality of sense amplifiers; and
wherein the sense amplifiers are configured to selectively output a WORD having:
9 bits when operating one of the first, second, third or fourth arrays;
18 bits by operating two of the first, second, third or fourth arrays;
27 bits by operating three of the first, second, third or fourth arrays; and
36 bits by operating all of the first, second, third and fourth arrays.

* * * * *